United States Patent [19]

Lüthi et al.

[11] Patent Number: 5,802,221
[45] Date of Patent: Sep. 1, 1998

[54] VEHICLE STEERING SHAFT BEARING BOX AND PROCESS FOR ITS MANUFACTURING

[75] Inventors: Rudolf Lüthi, Niederwangen; Alex Wehrli, Spengelried; Hans Jöhr, Kehrsatz, all of Switzerland

[73] Assignee: Styner & Bienz AG, Niederwangen, Switzerland

[21] Appl. No.: 880,874

[22] Filed: Jun. 23, 1997

[30] Foreign Application Priority Data

Jun. 27, 1996 [CH] Switzerland ............... 1615/96

[51] Int. Cl.⁶ ............................................. F16C 19/04
[52] U.S. Cl. ............................................. 384/537
[58] Field of Search .......................... 384/537, 585, 384/584, 439, 441

[56] References Cited

U.S. PATENT DOCUMENTS 3,631,327 12/1971 Payne .......................... 318/628
4,166,400 9/1979 Manning et al. ............... 74/552
5,239,888 8/1993 Sevault ........................ 74/492

Primary Examiner—Lenard A. Footland
Attorney, Agent, or Firm—Foley & Lardner

[57] ABSTRACT

Punched and bent parts (1, 2, 3), manufactured by non-cutting shaping, are assembled to a rigid box by using exclusively mutual riveting, optionally in part also spot welding, of the material of the punched and bent parts, thus without any additional material requirements. The parts (13) serving for bearing the steering shaft (15) are high precision pieces also obtained by non-cutting shaping. A very efficient, high precision manufacturing is thus achieved free from any finishing treatment and without auxiliary means for the connection of the punched and bent parts.

8 Claims, 4 Drawing Sheets

VEHICLE STEERING SHAFT BEARING BOX AND PROCESS FOR ITS MANUFACTURING

BACKGROUND OF THE INVENTION

1. Field of the Invention

This invention refers to a bearing box for a steering shaft of a vehicle. Furthermore, the invention is related to a process for the manufacture of such a bearing box.

2. Description of the Prior Art

Such bearing boxes are known and are for example used in passenger cars and other automotive vehicles. The known bearing boxes consist of a tube which has been formed from a steel plate by bending and welding, which surrounds the steering bar, and whose two ends are designed for receiving the steering bar bearings. The tube is further stiffened by a part welded thereon having a U-shaped section.

However, since it is very difficult to shape exactly cylindrical tubes from steel plates by bending and welding, the tolerances required at the tube ends when they are used as mounting sites for the steering shaft bearings are nearly impossible to obtain. Furthermore, the welding seams impair the final result and the tube ends must subsequently be treated; this step is costly and undesired.

SUMMARY OF THE INVENTION

The first and major objective of the invention is to provide a bearing box having a high stiffness and which makes possible a simple and precise bearing of the steering shaft of said vehicle.

Another objective of the invention is to provide a new and useful process for the manufacture of a bearing box. This process should be inexpensive and reliable.

The first objective is attained by a bearing box comprising a guiding piece which is intended to be fastened to the vehicle. The guiding piece surrounds the steering shaft and comprises a prefabricated continuous, seamless bearing mounting at both ends for receiving the steering shaft bearings. In this way, not only excellent bearing characteristics are guaranteed, but also freedom as to the further construction of the guiding piece is achieved, which allows optimization of the same.

The second objective is met by a process that comprises the shaping of a guiding piece capable to be fastened to the vehicle, from an essentially flat base material by punching, bending and fastening. The guiding piece which will surround the steering shaft is shaped during the manufacturing process in such a way that two mounting sites for receiving the steering shaft bearings are formed, and the fastening is effected without using additional fastening material. This achieves a proper and clean connection.

Other advantageous features and embodiments are defined in the depending claims. Thus, the mounting sites or locations are fastened to the guiding piece by riveting. The guiding piece may comprise a first portion having an essentially U-shaped section normally to the lengthwise direction of the steering shaft, and this first portion is terminated by a second, essentially flat portion. A third, essentially flat portion may be provided as a stabilizer. The guiding piece may be provided with fastening brackets. The said first portion may be weakened by a central notch; this measure allows to compensate for the spring-back resilience of its lateral legs in lengthwise direction of the steering shaft. The mounting locations for the steering shaft bearings can be connected to said second portion by curved brackets.

Further features and advantages will become evident from the description of special embodiments of the invention; this description is given for illustrating purposes only and will not limit the invention thereto.

DETAILED DESCRIPTION OF THE INVENTION

Figure 1:
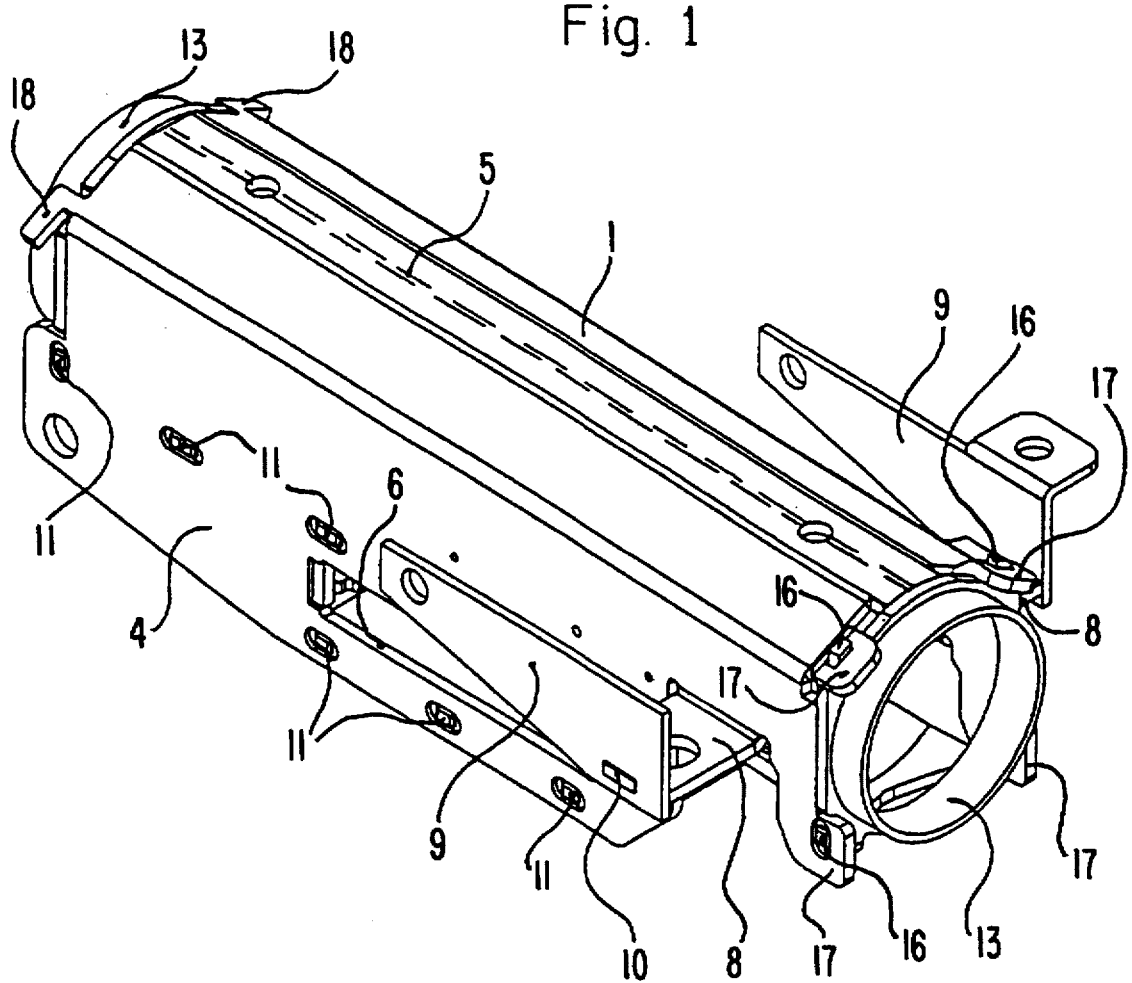
FIG. 1 is a perspective view of a bearing box according to the invention.

FIG. 1 shows a guiding piece consisting of three punched and bent parts 1, 2 and 3 fastened together by riveting. The parts 2 and 3 will be explained in more detail in the following with reference to the other figures. The punched and bent part 1 has a U-shaped section, comprising a curved upper portion and two flat lateral legs 4. The portion 1 has a weakening groove or notch 5 extending over its entire length at its summit. This weakening notch produces a weakened bending site which reduces residual tensions within the U-shaped, bent part 1 to a minimum which does no longer impair a sufficiently precise shaping during the manufacture. Both legs 4 of part 1 each comprise a slot or window 6. These windows are used to fasten the bearing box in a lengthwise displaceable manner on a traverse 7 of the vehicle (see FIG. 2). The part 1 is provided with lateral extensions 8 that can be used for mounting of, e.g., cables, conduits or similar elements. The holders 9 are riveted to the extensions 8 at the locations 10.

Figure 3:
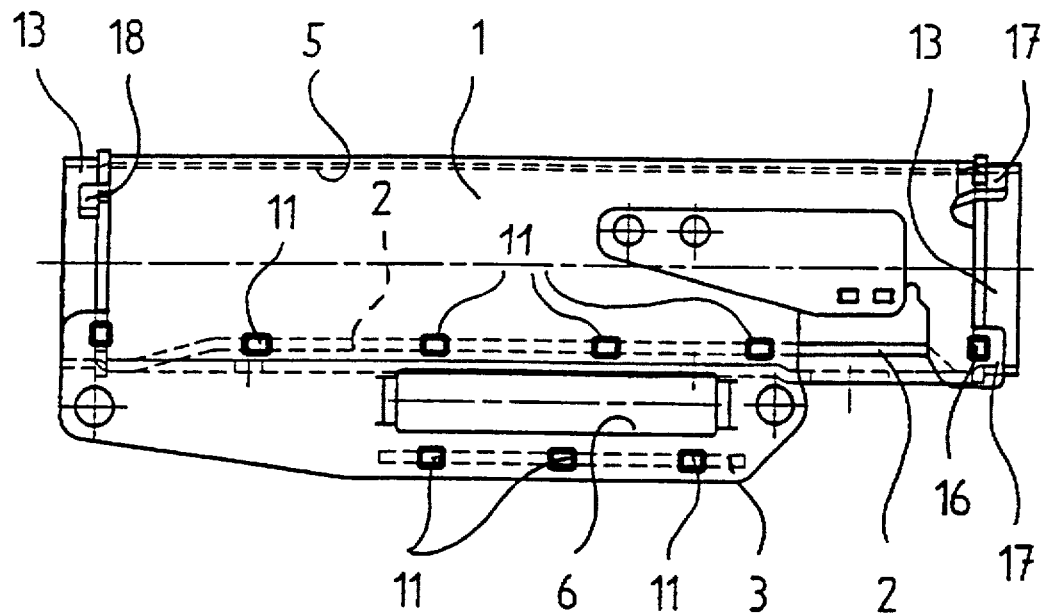
FIG. 3 shows a lateral view, and FIG. 4 a top view of the bearing box.
Figure 4:
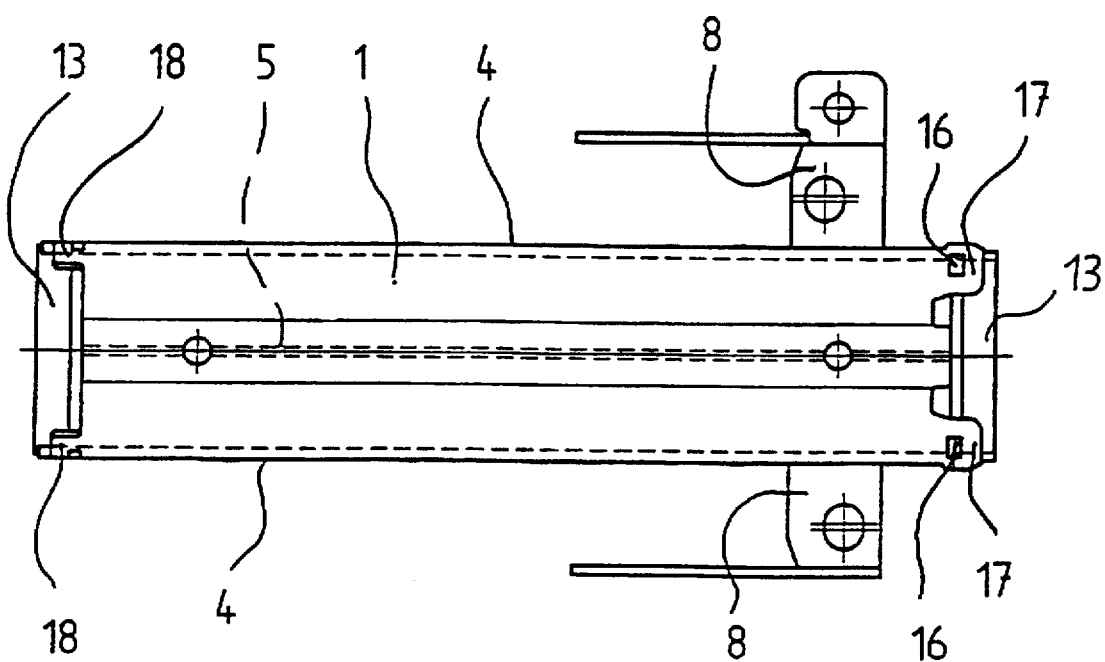
Figure 5:
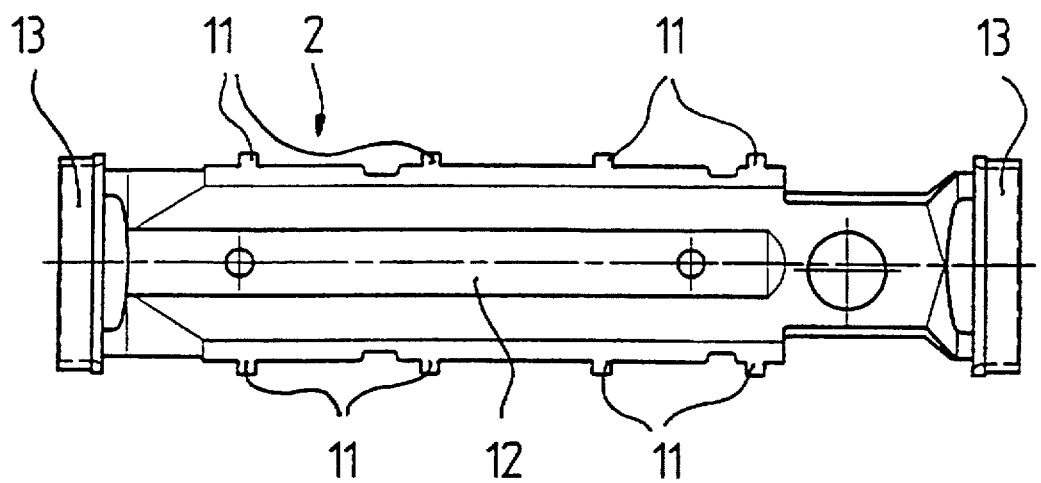
FIG. 5 shows a top view of a part.
Figure 6:
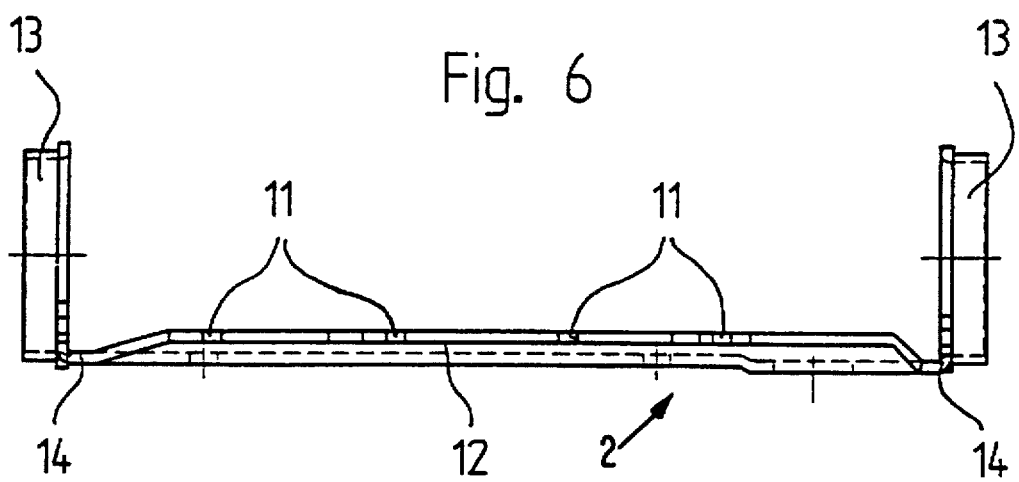
FIG. 6 is a lateral view of a part of the bearing box.
Figure 7:
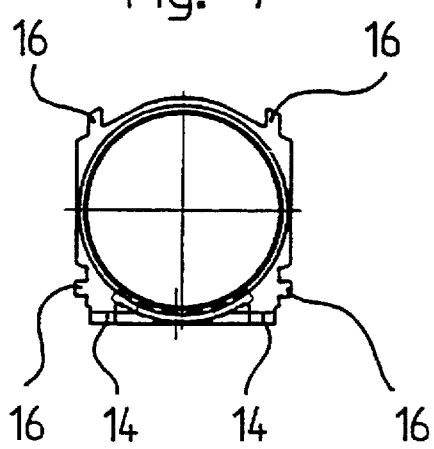
FIGS. 7 and 8 show frontal views of the part shown in FIGS. 5 and 6.
Figure 8:
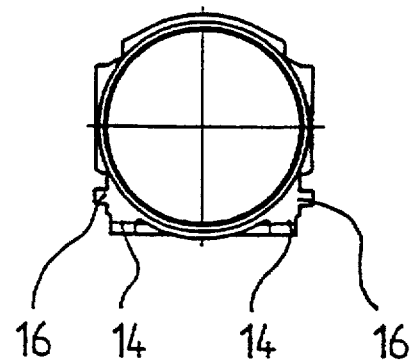

The parts 2 and 3 are connected to part 1 exclusively by riveting. The riveting spots 11 can be seen in FIGS. 1 and 3. The parts 2 and 3 comprise lateral tabs 11 that engage into corresponding holes in the legs 4 of part 1 and are caulked therein. Part 3 is shaped as a flat plate which stiffens and partially closes part 1 at its lower, open end. Part 2, which is individually shown in FIGS. 5 to 8, comprises a slightly vaulted central portion 12 bearing laterally tabs 11 for riveting with part 1. At its two ends, part 2 is integrally connected with bearing mountings or bearing receiving elements 13. These bearing mountings are manufactured free from seams by the ironing method (D & I; drawing and ironing), thus by non-cutting shaping with high precision. The separately shaped bearing mountings 13 take over the bearing functions of the bearing box whereas the guiding piece 1, 2, 3 insures the necessary rigidity.

Figure 2:
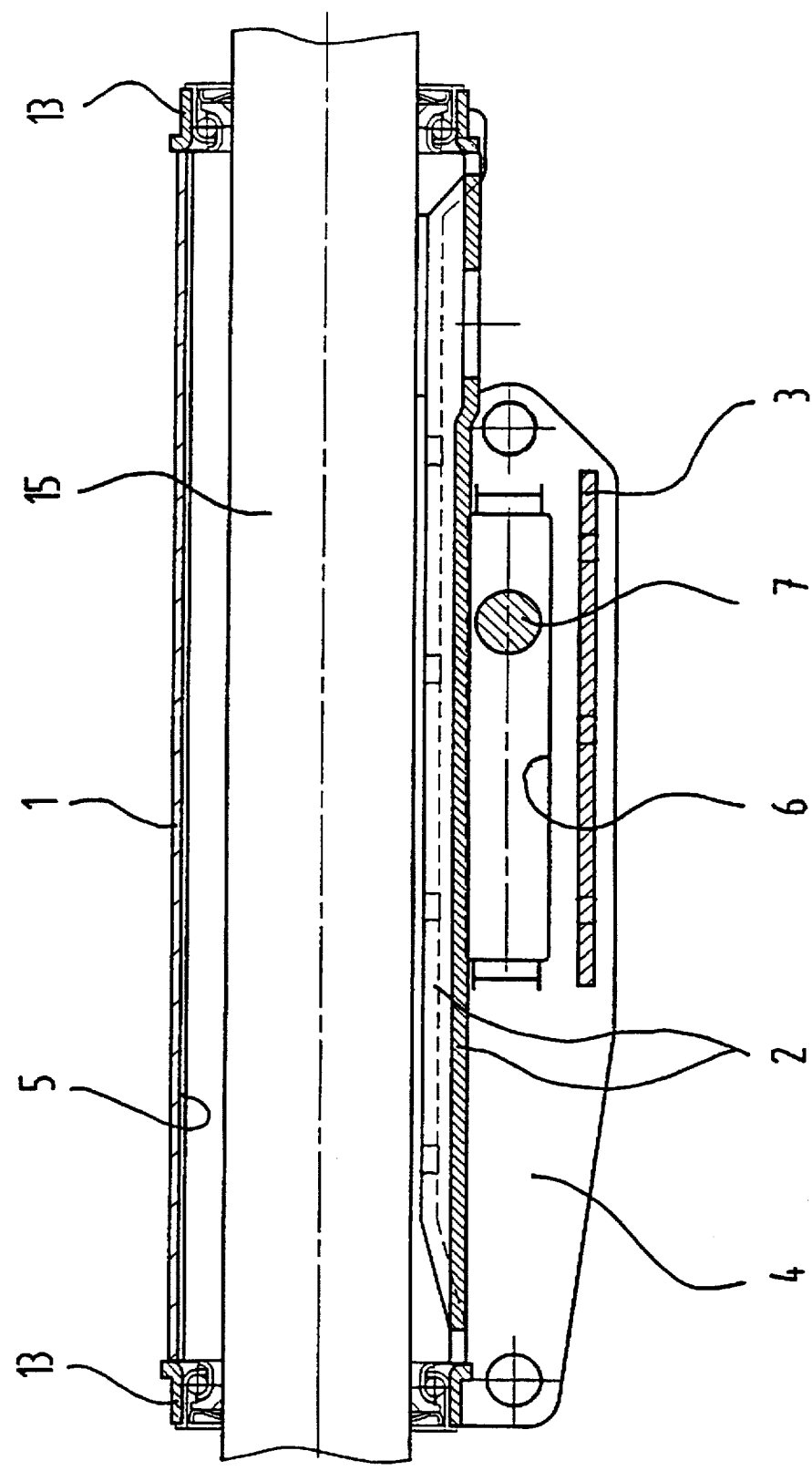
FIG. 2 shows a diagrammatic sectional view of the bearing box according to FIG. 1 together with the steering shaft.

The ring shaped bearing sites or bearing mountings 13 are connected by curved brackets 14 to the central portion 12 of part 2. As it is shown in FIG. 2, ball bearings are inserted with press fit into the rings 13 and serve to bear the steering shaft 15 that is only shown in FIG. 2. As it is specially shown in FIGS. 1, 7 and 8, the bearing mountings 13 are provided in the region of their flanges with riveting tabs 16 which are connected by riveting to projections 17 of part 1, see FIG. 1. The connection of parts 1 and 2 which is shown in the back of FIG. 1 is slightly differently shaped in that the connection is effected below by means of riveting tabs 16 according to FIG. 8 but above by means of hooks 18 of part 1 which engage behind flanges of the mounting 13. The parts 1 and 2 are thus fastened together at their central sections as well as near their frontal faces exclusively by parts that have been manufactured by non-cutting shaping, and then assembled.

Therefore, no additional fastening means and especially no welding operations are necessary which would require an additional and costly material application. One could only imagine to provide spot welding instead of riveting or to reinforce the rivets by spot welding.

It follows already clearly from the above description that the bearing box according to the invention is manufactured in a particularly efficient manner and with high precision by purely non-cutting shaping and final forming. All parts are first punched out from flat materials. Part 1 is then bent to its U shape in leaving however its legs somewhat spread for allowing the insertion of parts 2 and 3. The bearing mounting rings 13 of part 2 are formed by bending the brackets 14 to the shown shape and precisely adjusted. Parts 1, 2 and 3 are separately introduced in a special production device, the upper riveting tabs 16 of part 2 being inserted into the openings of the projections 17. The legs 4 of part 1 are then pressed into their plane-parallel configuration, and the riveting tabs of parts 2 and 3 enter into the corresponding openings of part 1, and riveting is carried out. The hooks 18 are also shaped tightly to the flange portions of one of the rings 13.

This procedure allows to automatize the manufacture in a particularly simple way in that exclusively shaping operations are to be effected without any welding, screwing or any other connection. The riveting is also exclusively carried out by elements formed to parts 1 to 3, thus without special rivets. Thus, no additional fastening material is required.

The manufacture of part 2 integrally with the bearing mountings 13 is particularly simple and offers the advantage that the two rings 13 for receiving the bearings are integrally connected to each other, thus ensuring not only a high precision of the inner diameter of the rings 13 for receiving the ball bearings, but also their particularly exact adjustment. Moreover, part 2 is simple to be stacked before bending, such facilitating its intermediate storing.

It might also be imagined to manufacture these bearing mountings 13 as separate parts and to rivet them to the other parts. The two parts 2 and 3 that serve as stiffening means would however also be used in this case to sufficiently stiffen the bearing box in transverse direction since this bearing box is subjected to important transversally directed forces in its built-in state. It will also be possible to manufacture the bearing mountings 13 integrally with part 1. In the claims, the ring shaped bearing mountings or bearing seats 13 are named generally as "bearing mountings". This term is to be understood as to design the locations in the bearing box which serve to bear the steering shaft 15 or to receive the bearings for this shaft. In principle, the rings 13 may also directly serve as bearing shells of plain bearings for the steering shaft 15.

We claim:

1. A bearing box for the steering shaft of a steerable vehicle, said bearing box comprising a guiding piece for surrounding the steering shaft, said guiding piece being arranged to be fastened to the vehicle and comprising at its two ends each a seamless bearing mounting for the steering shaft.

2. The bearing box according to claim 1, wherein said bearing mountings are both fastened to the guiding piece by means of riveting connections.

3. The bearing box according to claim 1, wherein said guiding piece comprises a first part for surrounding the steering shaft, this first part having an essentially U-shaped section normal to the lengthwise direction of the steering shaft and being closed by means of a second, essentially flat part.

4. The bearing box according to claim 3, wherein a third, essentially flat part is provided for stabilization purposes on the first part and parallel to the second part.

5. The bearing box according to claim 4, wherein said second part and said third part are fastened to said first part by means of riveting connections.

6. The bearing box according to claim 3, wherein said first part is weakened by a central notch in lengthwise direction of the steering shaft in order to compensate for the back-resilience of its lateral legs.

7. The bearing box according to claim 3, wherein the bearing mountings for the steering shaft are connected to said second part by means of curved brackets.

8. The bearing box according to claim 1, wherein said guiding piece is provided with lateral fastening tabs.

* * * * *

UNITED STATES PATENT AND TRADEMARK OFFICE
CERTIFICATE OF CORRECTION

PATENT NO. : 5,802,221
DATED : September 1, 1998
INVENTOR(S) : Rudolf LUETHI, et al.

It is certified that error appears in the above-identified patent and that said Letters Patent is hereby corrected as shown below:

In the Title Page, Item [54],
"MANUFACTURING" should read "MANUFACTURE."
Column 1, line 2,
"MANUFACTURING" should read "MANUFACTURE."

Signed and Sealed this

Fourth Day of May, 1999

Attest:

Q. TODD DICKINSON

*Attesting Officer*   *Acting Commissioner of Patents and Trademarks*